May 9, 1967 G. H. REED ETAL 3,319,012
METHOD AND APPARATUS FOR LUBRICATING MAGNETIC RECORDING TAPE
Filed Dec. 29. 1961
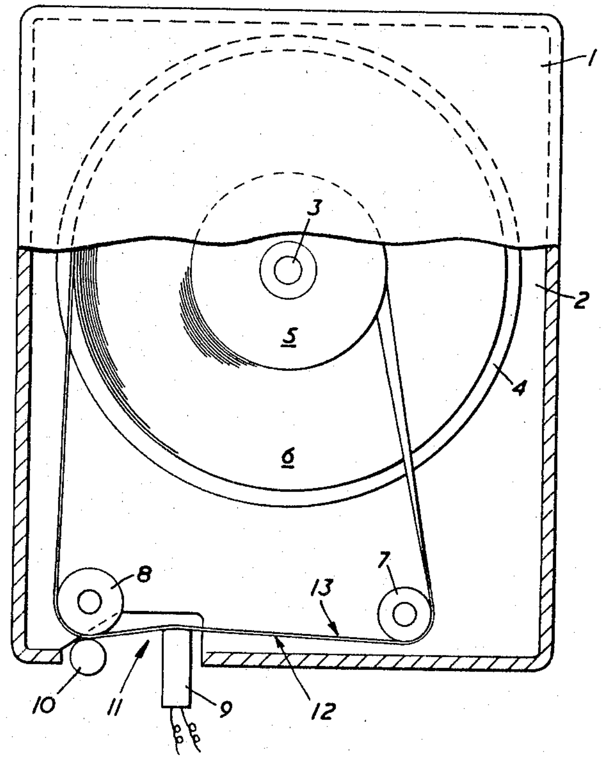
INVENTORS
Gordon Howard Reed, John George Vickers
BY
Richard [illegible] Agt 3,319,012

METHOD AND APPARATUS FOR LUBRICATING MAGNETIC RECORDING TAPE

Gordon Howard Reed and John George Vickers, both of 52 Esplanade, St. Helier, Jersey, Channel Islands, Great Britain Filed Dec. 29, 1961, Ser. No. 163,224
Claims priority, application Great Britain, Dec. 30, 1960, 44,704/60
2 Claims. (Cl. 179—100.2)

This invention is concerned with tape record units for use with magnetic recording and/or reproducing apparatus and, in particular, with such units of the kind in which an endless length of oxide-coated plastic-base tape, in the form of a roll, is accommodated in a cassette or other box-like housing and provides a loop of tape for co-operation with a playback or other magnetic head.

With magnetic tape record units of this kind the tape is drawn from the inside of the roll and, after passing the playback or other head, returns to the outside of the roll. Accordingly such movement of the tape results in there being relative movement between adjacent turns of the roll of tape during the use of the unit and, if rolls having several hundreds of turns are to operate in a satisfactory manner it is important to minimize frictional drag between the turns of the roll. Such frictional drag also leads to the build up of static charges between turns of the roll of tape and this can have a cumulative effect.

The object of the present invention is to provide a magnetic tape record unit of this kind in which the non-stick properties of polytetrafluoroethylene are employed to reduce frictional drag between adjacent turns of the roll of tape.

According to the present invention a magnetic tape record unit, of the kind hereinbefore set forth, comprises means so arranged and adapted that, during the time that one side of the tape is moving in contact with the magnetic head, it serves to apply polytetrafluoroethylene to the opposite side of said tape for the purpose of reducing frictional drag between adjacent turns of the roll of tape.

According to a particular feature of the invention, the application of the polytetrafluoroethylene is effected by providing a surface of polytetrafluoroethylene against which the tape bears during its movement with respect to the magnetic head. Conveniently, the surface of polytetrafluoroethylene is provided by a block, rod, tube or other suitable part formed from or containing a substantial amount of polytetrafluoroethylene.

The reduction of the frictional drag mitigates the building up of static charges between turns of the roll but as an extra precaution at least one of the two sides of the tape can have applied thereto finely divided graphite. For example that surface of the tape which comes into contact with the magnetic head can be provided with a coating of colloidal graphite which is very effective in preventing the buildup of static charges between turns of the roll.

In order that the invention can be understood more readily a preferred embodiment thereof will now be described with reference to the accompanying drawing the single figure of which shows, by way of example, a plan view, partly in section, of a magnetic tape record unit in association with a playback head and a tape-driving means. This unit comprises a box-like housing 1, from the base 2 of which there extends upwardly a spigot 3 about which is mounted a rotatable platform 4. A cylindrical boss 5 extends upwardly from this platform and is concentric with the axis of rotation of the latter. This cylindrical boss forms a core about which there is wound several hundreds of turns of magnetic tape of the oxide-coated plastic-base type. The ends of this roll 6 of tape are joined together to provide an endless length and a loop of the tape extends from the inner diameter of the roll, around a fixed pillar 7 and a roller 8 to the outer diameter of the roll.

This particular unit is adapted to be used in conjunction with a playback machine of known form which includes a magnetic head 9 and a tape-driving roller 10, the latter co-operating with the roller 8 carried by the unit. The wall of the casing 1 is provided with an opening 11 which allows a portion of the head 9 and the roller 10 to enter the casing so that the head contacts with the side 12 of the tape and the rollers 8 and 10 grip the tape so that when the roller 10 is being rotated, for example by an electric motor, tape is drawn from the inside of the roll, adjoining the periphery of the boss 5, around the pillar 7, past and in contact with the head 9 and then returns to the outside of the roll.

The pillar 7 comprises a sleeve of polytetrafluoroethylene and therefore, during the time that the side 12 of the tape is moving in contact with the magnetic head 9, the opposite side 13 of the tape is in rubbing contact with the polytetrafluoroethylene surface of the pillar 7 and polytetrafluoroethylene will be applied to the said side 13 of the tape. When the tape returns to the roll the polytetrafluoroethylene carried by the side 13 will function to reduce frictional drag between adjacent turns of the roll.

The face 12 of the tape can have a coating of colloidal graphite applied thereto in order to mitigate against the building up of static charges between adjacent turns of the roll of tape.

By providing the surface of polytetrafluoroethylene as a sleeve upon a pillar, the renewal of the surface by replacement of a worn sleeve is facilitated and moreover, if unintentionally over a long period of time the tape wears through the sleeve, the support for the sleeve will continue to act as a guide for the tape.

In a modified embodiment of the invention a block of polytetrafluoroethylene is mounted at the end of a lever (not shown in the drawing) which is arranged to hold the tape in contact with the magnetic head, the other end of this lever being used to prevent rotation of the platform 4 when the unit is disengaged from the head and the tape-driving means.

The polytetrafluoroethylene surface can be provided by a block or other member which is attached to the unit or a part thereof in a manner which facilitates renewal of the surface. For example the casing of the unit can be provided with recesses adapted to accommodate and locate a rod of polytetrafluoroethylene and when this rod has been worn down it can be replaced by a corresponding new rod.

What we claim is:

1. A magnetic record unit comprising:
(a) a housing having an opening,
(b) a magnetic head mounted so as to have a portion thereof enter from outside of said housing through said opening and project into the interior of said housing,
(c) means rotatably mounted within said housing for supporting a coil of an endless length of oxide-coated plastic base tape, said tape having a first and a second surface, said first surface having finely divided graphite applied therto,
(d) means for
(1) having a loop of said tape travel away from said coil,
(2) having said loop pass within said housing across said opening,
(3) having said first surface contact said portion, and
(4) having said loop return to said coil, and (e) means within said housing for applying polytetrafluoroethylene to said second surface.

2. A method of reproducing a record on an endless length of oxide-coated plastic base tape, said tape having a first and a second surface and being in the form of a coil accommodated in a housing having an opening, said first surface having finely divided graphite applied thereto, said method comprising:

(a) causing a loop of said tape to travel away from said coil,
(b) passing said loop within said housing across said opening,
(c) causing said first surface to contact a portion of a magnetic head, projecting from outside of said housing through said opening into said housing,
(d) causing said loop to return to said coil, and
(e) applying polytetrafluoroethylene to said second surface.

References Cited by the Examiner

UNITED STATES PATENTS

| | | | |
|---|---|---|---|
| 2,778,636 | 1/1957 | Eash | 179—100.2 |
| 2,908,246 | 10/1959 | Alexander et al. | 179—100.2 X |
| 2,911,215 | 11/1959 | Cousino | 179—100.2 X |
| 3,032,613 | 5/1962 | Namenyi-Katz | 179—100.2 |

FOREIGN PATENTS

| | | |
|---|---|---|
| 830,364 | 3/1960 | Great Britain. |

BERNARD KONICK, *Primary Examiner.*

IRVING L. SRAGOW, J. BREIMAYER, *Assistant Examiners.*